US012801529B2

(12) United States Patent
Helmick et al.

(10) Patent No.: US 12,801,529 B2
(45) Date of Patent: *Nov. 17, 2026

(54) SYSTEMS AND METHODS FOR PRE-POPULATING ADDRESS TRANSLATION CACHE

(71) Applicant: Samsung Electronics Co., Ltd., Suwon-si (KR)

(72) Inventors: Daniel Lee Helmick, Broomfield, CO (US); Vipin Kumar Agrawal, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/755,517

(22) Filed: Jun. 26, 2024

(65) Prior Publication Data

US 2024/0354255 A1 Oct. 24, 2024

Related U.S. Application Data

(63) Continuation of application No. 17/879,713, filed on Aug. 2, 2022, now Pat. No. 12,032,483.

(60) Provisional application No. 63/329,755, filed on Apr. 11, 2022.

(51) Int. Cl.
*G06F 12/0868* (2016.01)

(52) U.S. Cl.
CPC .... *G06F 12/0868* (2013.01); *G06F 2212/313* (2013.01)

(58) Field of Classification Search
CPC ........... G06F 12/0868; G06F 2212/313; G06F 12/0238; G06F 12/1027; G06F 12/1072; G06F 2212/1024; G06F 2212/2022; G06F 2212/7201; G06F 2212/7203; G06F 3/061; G06F 3/064; G06F 3/0679
See application file for complete search history.

(56) References Cited

U.S. PATENT DOCUMENTS

| | | | |
|---|---|---|---|
| 5,940,596 | A | 8/1999 | Rajan et al. |
| 6,715,057 | B1 | 3/2004 | Kessler et al. |
| 7,334,107 | B2 | 2/2008 | Schoinas et al. |
| 7,870,301 | B2 | 1/2011 | Arndt et al. |
| 8,621,120 | B2 | 12/2013 | Bender et al. |
| 8,635,407 | B2 | 1/2014 | Cleveland et al. |
| 10,078,588 | B2 | 9/2018 | Basu et al. |
| 10,095,620 | B2 | 10/2018 | Craddock et al. |

(Continued)

FOREIGN PATENT DOCUMENTS

| | | | |
|---|---|---|---|
| CN | 113297105 | A | 8/2021 |
| CN | 114064352 | A | 2/2022 |
| TW | 202117550 | A | 5/2021 |

*Primary Examiner* — Jane W Benner
(74) *Attorney, Agent, or Firm* — Womble Bond Dickinson (US) LLP

(57) ABSTRACT

Systems and methods for processing commands from a host computing device to a storage device are disclosed. The method includes identifying, by the storage device, a command from the host computing device, the command including a logical address; detecting a condition; based on detecting the condition, requesting, by the storage device, translation of the logical address into a physical address; storing, by the storage device, the physical address in a cache; and transferring data according to the command based on the physical address.

20 Claims, 10 Drawing Sheets

(56) References Cited

U.S. PATENT DOCUMENTS

| | | | | |
|---|---|---|---|---|
| 10,223,305 | B2 | 3/2019 | Klein et al. | |
| 10,261,912 | B2 | 4/2019 | Coppola et al. | |
| 10,645,164 | B1 | 5/2020 | Malwankar et al. | |
| 10,747,679 | B1 | 8/2020 | Larson et al. | |
| 10,761,995 | B2 | 9/2020 | Blaner et al. | |
| 10,929,310 | B2 | 2/2021 | Borikar et al. | |
| 11,010,095 | B2 | 5/2021 | Richter et al. | |
| 11,113,209 | B2 | 9/2021 | Evans et al. | |
| 11,294,779 | B2 | 4/2022 | Lee et al. | |
| 2004/0219745 | A1* | 11/2004 | Park | G11C 8/18 438/239 |
| 2006/0179173 | A1 | 8/2006 | Bockhaus | |
| 2007/0061549 | A1* | 3/2007 | Kaniyur | G06F 12/1081 711/E12.067 |
| 2009/0144508 | A1 | 6/2009 | Freimuth et al. | |
| 2012/0260349 | A1 | 10/2012 | Nagai | |
| 2014/0297964 | A1 | 10/2014 | Nakase | |
| 2017/0139716 | A1 | 5/2017 | Caulfield et al. | |
| 2019/0004944 | A1* | 1/2019 | Widder | G06F 12/0246 |
| 2019/0034367 | A1 | 1/2019 | Kakaiya et al. | |
| 2020/0042412 | A1 | 2/2020 | Kulkarni | |
| 2020/0073701 | A1 | 3/2020 | Park | |
| 2020/0133567 | A1* | 4/2020 | Hutchison | G06F 3/0673 |
| 2020/0356280 | A1* | 11/2020 | Sela | G06F 3/0661 |
| 2021/0073151 | A1 | 3/2021 | Sen et al. | |
| 2022/0300409 | A1* | 9/2022 | Duan | G06F 13/1668 |

* cited by examiner

SYSTEMS AND METHODS FOR PRE-POPULATING ADDRESS TRANSLATION CACHE

CROSS-REFERENCE TO RELATED APPLICATION(S)

The present application is a continuation of U.S. patent application Ser. No. 17/879,713, filed Aug. 2, 2022, which claims priority to and the benefit of U.S. Provisional Application No. 63/329,755, filed Apr. 11, 2022, entitled "JUST IN TIME ATC PRE-POPULATION FOR READS," the entire content of each of which is incorporated herein by reference.

FIELD

One or more aspects of embodiments according to the present disclosure relate to managing memory, and more particularly to managing utilization of cache memory that stores physical memory addresses associated with virtual memory addresses.

BACKGROUND

A host device may interact with a storage device in one or more virtual memory address spaces. Shared memory for various uses such as submitting and completing commands or sending or receiving data may require the device to translate the host's virtual addresses into physical addresses such that the data may be correctly located. The read and write requests may include virtual memory addresses. The virtual memory addresses are translated into physical memory addresses by the Translation Agent, and the translated physical address may be stored in an address translation cache (ATC) of the storage device. Cache memory space is generally limited. Thus, it may be desirable to populate the physical memory address for efficient and effective use of the ATC.

The above information disclosed in this Background section is only for enhancement of understanding of the background of the present disclosure, and therefore, it may contain information that does not form prior art.

SUMMARY

Embodiments of the present disclosure are directed to a method for processing commands from a host computing device to a storage device. The method includes identifying, by the storage device, a command from the host computing device, the command including a logical address; detecting a condition; based on detecting the condition, requesting, by the storage device, translation of the logical address into a physical address; storing, by the storage device, the physical address in a cache; and transferring data according to the command based on the physical address.

According to one embodiment, the method includes starting, by the storage device, a first timer in response to identifying the command, wherein the condition includes detecting expiration of the first timer.

According to one embodiment, length of the first timer is shorter than a predicted latency of processing the command. The of the first timer may be dynamically computed based on a number of active commands to be processed.

According to one embodiment, the method further comprises: setting, by the storage device, a second timer; detecting expiration of the second timer; based on the expiration of the second timer, requesting, by the storage device, the translation of the logical address into the physical address, wherein length of the second timer is based on an expected length of completing an event during processing of the command by the storage device.

According to one embodiment, the event includes invoking an error recovery action.

According to one embodiment, the command includes a command to read the data from the storage device, wherein the logical address is for storing the data in a memory location of the host computing device.

According to one embodiment, the method further comprises: monitoring progress of execution of the command, wherein the detecting the condition includes determining that a milestone has been reached.

According to one embodiment, the monitoring includes monitoring a plurality of steps executed for the command.

According to one embodiment, the milestone includes completion of sensing of signals from one or more memory cells of the storage device.

Embodiments of the present disclosure are also directed to a storage device that includes cache; and a processor coupled to the cache, the processor being configured to execute logic that causes the processor to: identify a command from a host computing device, the command including a logical address; detect a condition; based on detecting the condition, request translation of the logical address into a physical address; store the physical address in the cache; and transfer data according to the command based on the physical address.

An embodiment of the present disclosure is further directed to a method for processing commands from a host computing device to a storage device, the method comprising: identifying, by the storage device, a plurality of write commands from a host computing device; storing, by the storage device, the plurality of write commands in a queue of the storage device; selecting, by the storage device, a write command from the queue; identifying, by the storage device, a logical address of the write command selected from the queue; requesting, by the storage device, translation of the logical addresses into a physical address; storing, by the storage device, the physical addresses in a cache; and transferring data according to the write command selected from the queue based on the physical address.

According to one embodiment, the method further includes determining that a write buffer is full, wherein the storing of the write commands in the queue is in response to determining that the write buffer is full.

An embodiment of the present disclosure is further directed to a method for processing commands from a host computing device to a storage device, the method comprising: identifying, by the storage device, a write command from a host computing device, wherein the write command includes a first logical address; processing a first data transfer based on the first logical address, wherein the processing of the first data transfer includes: identifying a second logical address; requesting, by the storage device, translation of the second logical address into a physical address; and storing, by the storage device, the physical addresses in a cache; and processing a second data transfer based on the second logical address.

According to one embodiment, the processing of the second data transfer includes: retrieving from the cache the physical address; and transferring data from the physical address, to a location in the storage device.

According to one embodiment, the first logical address is stored in a first data structure, and the second logical address is stored in a second data structure.

As a person of skill in the art should recognize, embodiments of the present disclosure provide efficiencies in processing commands from the host computing device.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
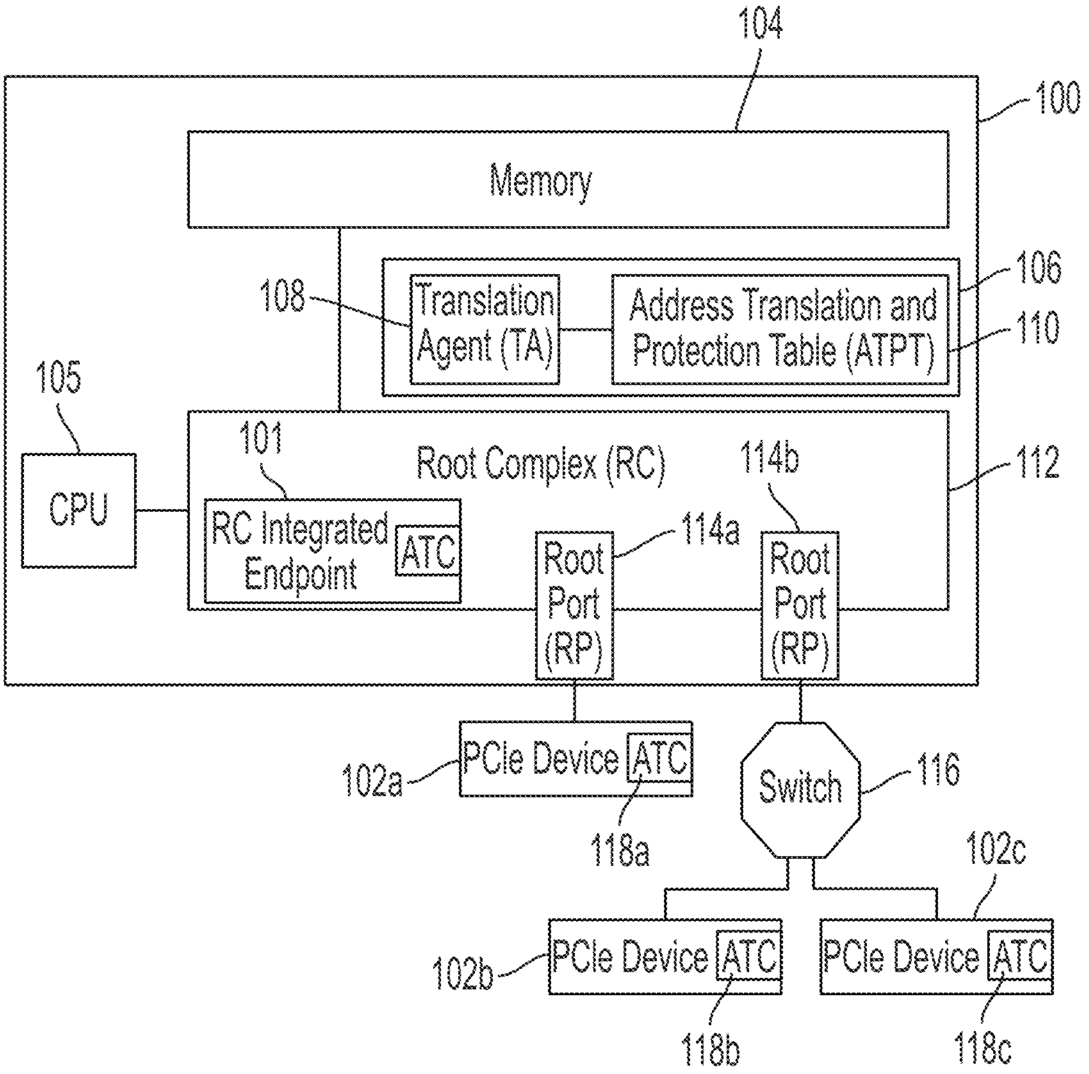
FIG. 1 is a block diagram of a system for pre-populating an address cache according to one embodiment.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

A host device may interact with a storage device in one or more virtual memory address spaces. For example, the shared memory may be used to submit and complete I/O commands such as read or write commands. Communication between the host device and the storage device may be via an interface (e.g., connector and protocol thereof) such as a non-volatile memory express (NVMe) protocol, serial attached small computer system interface (SAS) protocol, serial advanced technology attachment (SATA) protocol, and/or the like.

In one embodiment, the I/O commands from the host identify a virtual address. For example, the virtual address of a read command identifies a location in the host memory where data read from the storage device is to be stored, and the virtual address of a write command identifies a location in the host memory to retrieve data for writing into the storage device. The memory reads of the host memory by the storage device for executing the read and write commands may be direct memory accesses (DMAs) that bypass a central processing unit (CPU) of the host.

In one embodiment, the virtual addresses in the read/write commands are translated to physical memory addresses of the host memory by the Translation Agent (TA). Once translated, the physical memory addresses are stored in an address translation cache (ATC) of the storage device for use by the DMA read and write operations. A controller of the storage device may check the ATC for the presence of the physical memory address that corresponds to a virtual address in the read/write command. If found present in the ATC, the controller may access the host memory using the translated physical memory address.

In one embodiment, a virtual address that is translated into a physical address is stored in the ATC of the storage device. In order for the controller of the storage device to access the host memory in response to a read or write request, the controller checks the ATC for determining whether there is a translation of the virtual address to the physical address. If the translation exists, the controller uses the converted physical address for the memory read, and need not make a separate request to the host for the address translation.

The address translation of virtual to physical memory addresses may add a delay to the read and/or write operation. Memory reads by the storage device in a virtualized addressing environment must wait until the address translation completes before memory locations are accessed. The storage device must request an address translation (AT) from the TA. The TA must identify the correct translation from an address translation and protection table (ATPT), and the TA must provide a response to the address translation request. Since the read or write data will be held by the host in a virtual address space, the process of translating the virtual address may block the processing flow of a read/write command.

The delay may be longer in the event of the virtual address not being present in the ATPT. As before, the storage device must request an AT from the TA. The TA will fail to find the correct translation in the ATPT. The TA will respond to the original AT with a failure. In the event of a failure, the device will send a Page Request Interface (PRI) to the TA. The TA will communicate with the rest of the Host system in a vendor specific manner to populate the virtual to physical translation into the ATPT. The TA will finally send a completion response to the device's PRI request. The device will send a second AT to the TA, and the TA will now be able to find the virtual address in the ATPT. Making it an even further blocking activity for accessing the memory locations.

Once a translated address is stored in the ATC, the length of time it remains in the ATC prior to usage during a DMA may depend on the size of the ATC and/or the number of active read/write commands that the storage device may handle at a given time. For example, in a substantially high queue depth (QD) environment with a substantially high number of active commands submitted by the host to a submission queue (hereinafter referred to as submission queue entries (SQE)), the ATC may fill up as the requests are being processed, causing an older translated address for an older request to be evicted from the ATC to make room for a newer translated address for a newer request. Another common usage of an ATC is to store previously used address translations in a speculative manner in case that address translation is needed again. Both the higher rate of ATC population requests and the increased desire to maintain recently useful address translations may result in a higher eviction rate from the ATC than optimal. The higher eviction rate may be correlated with a reduced probability of a required address translation being present in the ATC when the SSD needs to access the host memory. A larger sized ATC may help address the problem, but increased ATC size occupies a larger area of a static random access memory (SRAM) that stores the ATC, resulting in increased costs and increased power usage.

Embodiments of the present disclosure are directed to systems and methods for coordinating an early population (also referred to as pre-population) of an ATC to avoid address translation requests (and PRI requests) from being blocking activities during a direct memory access. In one embodiment, a timer is employed for triggering the address translation request. The timer may be set to expire after receiving and parsing an SQE containing an input/output (I/O) command (e.g. read command), but before the execution of the command terminates. Expiration of the timer may trigger the transmitting of the address translation request for a virtual address included in the I/O command. The timer may be set so that the translated address is inserted into the ATC substantially close in time to it being used by the controller to perform a memory access in according to the I/O command.

In one embodiment, an address translation request is triggered based on a detected progress of processing the I/O command in the parsed SQE, such as for example, a read command. Monitoring progress of the I/O command flow may allow the timing of the submission of the address translation request to be dynamic and catered to the progress of the I/O command flow. For example, if the I/O command flow encounters a blocking activity substantially early in the command flow, the translation of the memory address may not be triggered until the command flow progresses to reach a milestone later in the command flow.

For a read command, the one or more steps of the command flow that may be monitored by the controller for determining whether an address translation request should be submitted may generally include: 1) receipt of a SQE by a controller of the storage device; 2) parsing the command to identify one or more physical locations in the storage device where data is to be retrieved; 3) reading the data from the media (e.g., read sense of the data stored in the NAND die); 4) transfer of data from the media to the controller; 5) error correction code (ECC) decoding to check and/or remove any potentially accumulated errors; and 5) direct memory access of the host memory for providing the read data. In one embodiment, the controller monitors the progress of the steps for the read command, and initiates an address translation request to the host after detecting the NAND has completed the read sense, and prior to transfer of the sensed data from the NAND to the controller. This may allow the translated address to be present in the ATC when step 5 is executed, and the read command may not be delayed.

In one embodiment, address translation requests are initiated in response to expiration of multiple timers. For example, a first timer may be set as described above to initiate the address translation before completing a read command. In addition to the first timer, a second timer may be set (e.g. concurrently with the setting of the first timer). The second timer may be set to address an additional latency that may be introduced during execution of the read command.

In one embodiment, the additional latency is introduced by a detected event. The additional latency may be predictable. The second timer may be set based on the predicted/expected latency. For example, the length of the second timer may be set to be shorter than the predicted latency. An address translation request may be triggered upon expiration of the second timer. In this manner, even if the translated address obtained after expiration of the first timer is evicted out of the ATC (e.g. due to the additional latency introduced by the detected event), the use of the second timer may allow the address to be repopulated into the ATC in time for it to be used for the memory access according to the read command.

In one embodiment, the value of the first and/or second timers are fixed, preset values and they start at the receipt and parsing of the SQE. In one embodiment, the value of the first and/or second timers are dynamically determined prior to being set. In one embodiment, the value of the timer(s) is a function of the read QD and/or write QD, where the read QD is representative of a number of active read commands in the submission queue that may be processed by the storage device at a given time, and the write QD is representative of a number of active write commands in the submission queue. In one embodiment, the length of the second timer is greater than the length of the first timer. In some embodiments, the storage device may monitor average time to complete read sense and reevaluate the first and/or second timers. In some embodiments, an average time may be associated with particular conditions detected by the storage device, and the first and/or second timers may be set based on the average time.

Write commands may also benefit from pre-population of the ATC. For example, pre-population of the ATC for write commands may be beneficial in a substantially high QD environment (e.g. QD>50). In the substantially high QD environment, the controller may fill an internal write command queue with active write commands fetched from the submission queue while awaiting some controller resource (e.g., write buffer to hold the write data prior to programming to NAND) to become available. The write commands may be processed from the internal write command queue one at a time, in a first-in-first-out manner. In this case, address translation requests may be started for X out of N total write commands in the internal write queue, and the translated addresses will be placed in the ATC. As write commands proceed through the controller, the address translation may already be completed for the write command, and the translated address will be present in the ATC.

Pre-population of the ATC may also aid in achieving a more efficient processing of write commands that invoke a substantially long list of memory locations according to one embodiment. For example, an SQE for a large write command may use a linked list of data structures identified via Physical Region Page (PRP) entries or Scatter Gather List (SGL) segments. Each of these PRP or SGL SQE command structures may be placed in a very diverse set of host memory locations that all require an address translation. In one embodiment, an address translation for one or more of the upcoming memory addresses may be requested while a data transfer and processing of a current memory location is being processed. In this manner, the translation may be populated in the ATC before it is time to do a data transfer for that memory address.

FIG. 1 is a block diagram of a system for pre-populating an address cache according to one embodiment. The system includes a host computing device 100 coupled to one or more endpoints such as, for example, one or more storage devices 102*a*-102*c* (collectively referenced as 102). Hereinafter, the term endpoints and storage devices 102 will be used interchangeably.

The endpoints may communicate with the host device 100 over a network fabric such as, for example, a Peripheral Component Interconnect (PCI) or PCI-Express (PCIe) bus. As such, the endpoints in the illustrated example may also be referred to as PCIe devices. In some cases, the endpoints may also include endpoints 101 integrated into the host device 100. NVMe is a protocol generally carried over PCIe. In some embodiments, the endpoints may communicate over communication links other than PCIe, including, for example, Compute Express Link (CXL), NVMe over Fabrics, Serial Attached Small Computer System Interface (SAS), Serial Advanced Technology Attachment (SATA), Cache Coherent Interconnect for Accelerators (CCIX), or the like.

The host device 100 may write and read data to and from the storage device 102 over the PCIe fabric. The storage device 102 may perform direct access of a local memory 104 of the host device 100 in processing the read and write commands. The direct memory access may allow data to be transferred into and out of the host memory 104 without involvement of software of a processor 105 of the host device 100.

In one embodiment, the host device 100 further includes a memory management unit 106 that may include a translation agent (TA) 108 and an address translation and protection table (ATPT) 110. The TA 108 may provide address translation services to the endpoints (e.g. storage device 102) to translate virtual addresses to real physical addresses of the host memory 104. In one embodiment, the AT 108 may retrieve a physical address corresponding to a virtual address from the ATPT 110.

The host device 100 may further include an interface 112 such as a PCIe interface. The PCIe interface may implement a root complex (RC), for connecting the processor 105 and host memory 104 to the PCIe fabric. The interface 112 may include one or more ports 114 to connect the one or more endpoints (e.g. storage devices 102) to the RC 112. In some cases, the endpoints may be coupled to a switch 116, and the switch may then connect to the RC 112 via one of the ports 114. In some embodiments, the TA 108 may be integrated into the RC 112.

In one embodiment, messages sent from the storage devices 102 to the TA 108, such as, for example, requests for address translation, are delivered over the PCIe fabric to the RC 112, which in turn delivers the requests to the TA 108. Messages sent from the TA 108 to the storage devices 102, such as, for example, responses to the requests from the storage devices 102, are delivered from the TA 108 to the RC 112, which sends the messages over the PCIe fabric to the storage devices 102.

In one embodiment, at least one the storage devices 102 includes an address translation cache (ATC) 118*a*, 118*b*, or 118*c* (collectively referenced as 118) for storing mappings between virtual (untranslated) addresses and physical (translated) addresses. When the storage device 102 receives a read/write command from the host 100 with a virtual address, the storage device 102 may check the local ATC 118 for determining whether the cache already contains the translated address. If the ATC 118 already contains the translated address, the storage device 102 may efficiently access the host memory 104 at the physical address, without involving the RC 112, and TA 108. If the ATC 118 does not contain the translated address, the storage device 102 may transmit an address translation request to the TA 118 with the virtual address (or address range) to be translated.

Figure 2:
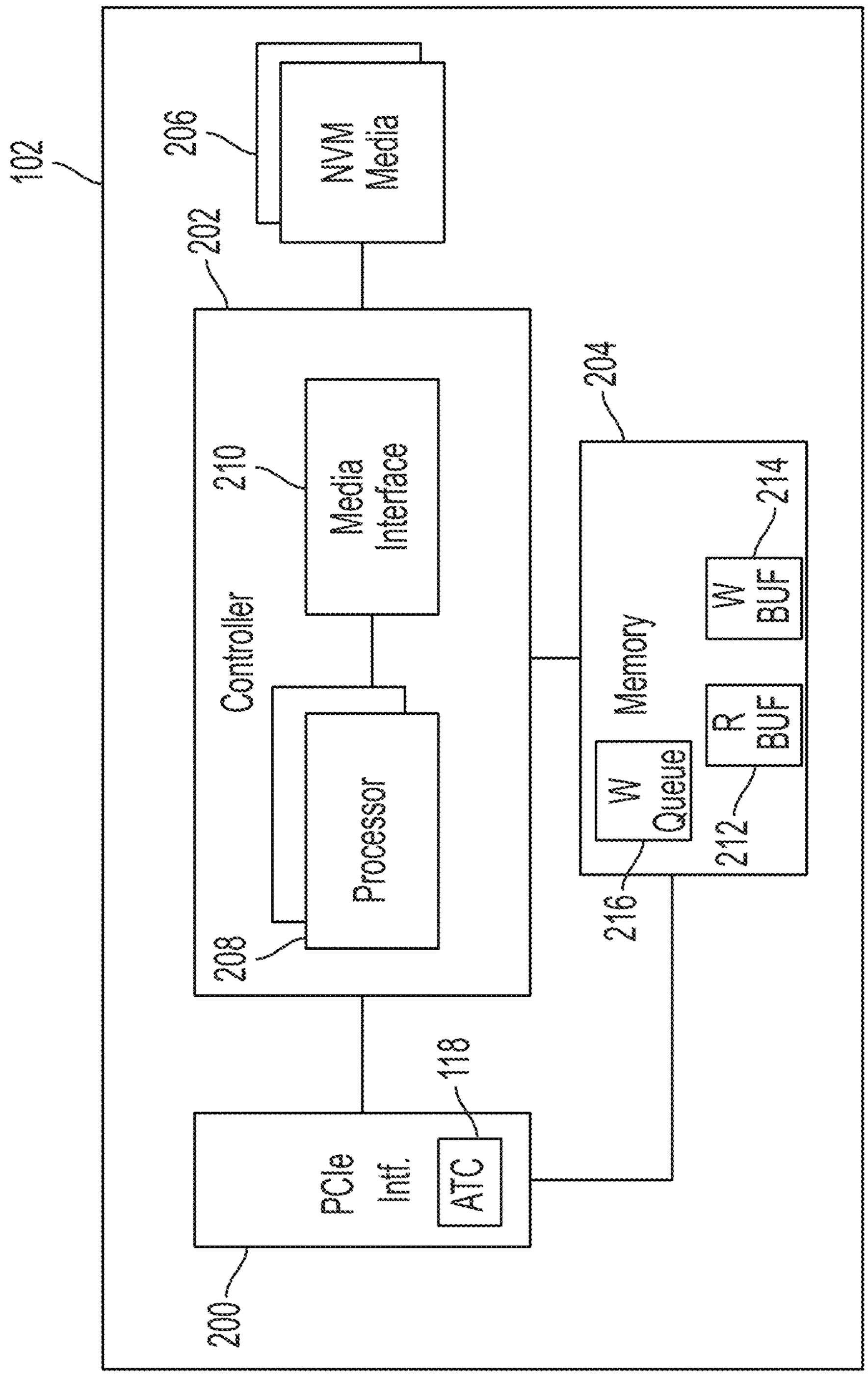
FIG. 2 is a block diagram of a storage device according to one embodiment.

FIG. 2 is a block diagram of the storage device 102 according to one embodiment. The storage device 102 may include a communications interface 200, a device controller 202, an internal memory 204, and non-volatile memory (NVM) media 206. The communications interface 200 may include PCIe ports and endpoints that enable ingress communications from the host 100 to the storage device 102, and egress of communications from the storage device 102 to the host 100. In one embodiment, the communications interface 200 stores the ATC 118 with mappings of one or more virtual addresses to physical addresses.

In one embodiment, the device controller 202 executes commands requested by the host 100, such as, for example, read and write commands. The device controller 202 may include, without limitation, one or more processors 208 and media interface(s) 210. The one or more processors 208 may be configured to execute computer-readable instructions for processing commands from the host 100, and for managing operations of the storage device 102. The computer-readable instructions executed by the one or more processors 208 may be, for example, firmware code.

In one example, the one or more processors 208 may be configured to process write or read commands to or from the NVM media 206. The one or more processors 140 may interact with the NVM media 206 over the media interface 210 for effectuating the write or read actions. The NVM media 206 may include one or more types of non-volatile memory such as, for example, flash memory, NAND, ReRAM, PCM, MRAM. The storage device may also be an HDD with different internal controller architectures.

In one embodiment, the internal memory 204 is configured for short-term storage or temporary memory during operation of the storage device 104. The internal memory 138 may include a DRAM (dynamic random access memory), SRAM (static random access memory), and/or DTCM (Data Tightly Coupled Memory). The internal memory 138 may further include buffers, such as a read buffer 212 and a write buffer 214, for temporarily storing data transferred to and from the host memory 104 while processing a read and a write command. The internal memory 138 may further include an internal write queue 216 for storing write commands received from the host 100 that may not be able to be immediately processed due to, for example, lack of space in the write buffer 214. The internal write queue 216 may be, for example, a first-in-first-out (FIFO) queue.

In one embodiment, the controller 202 is configured to identify/receive (e.g. via a fetch action) from the host 100, an SQE with a read/write command. The number of read/write commands provided by the host to the controller 202 at a time (commands in flight) may be referred to as the Queue Depth (QD) of commands. In a low QD environment (e.g. QD=1 with one outstanding command at a time provided to the drive by the host), a latency for processing a command (e.g. read command) may be predictable. For a low read QD environment, the controller 202 may set a timer to trigger transmission of a request for address translation via the communications interface 200, upon expiration of the timer. In one embodiment (e.g. with a substantially large ATC 118), the controller 202 may set the length of the timer to be 0. A timer with a value of 0 may cause the request for address translation to be sent upon receipt of the read command by the controller 202, without any delay. This implementation is taking advantage of the low QD by assuming low ATC utilization. The low ATC utilization reduces the probability of the cache entry being evicted by the time the translation is needed.

In one embodiment, the controller 202 sets the length of the timer to be shorter than an expected read latency. For example, if the predicted read latency is 50 microseconds, the timer may be set to expire at 45 microseconds. The prediction may be the result of earlier characterization or modeling work, or it may be the results of ongoing drive measurements. The address translation request may be sent from the device to the host at the expiration of the 45 microseconds, and the host may complete the address translation, for example, close to 50 microseconds, in time to be used to perform the direct memory access at the translated address.

In one embodiment, the length of the timer varies as a function of the QD of read commands and/or write commands. The controller 202 may compute the length of the timer prior to setting of the timer based on the environment in which the timer is deployed. In one exemplary function, the higher the QD, the longer the length of the timer. In one embodiment, the length of the timer varies as a function of one or more of a number of NVM media 206 die, time of operations on the die, type of operations on the die, time in the controller 202, conflicts for resources in the controller 202, and/or the like.

In one embodiment, the controller 202 may set a second timer in addition to a first timer for triggering a second address translation. For example, the second timer may be set based on an event (hereinafter referred to as an anticipated event) that could happen during a read flow. The event may be, for example, invoking an action outside of a normal read flow, such as, for example, a second stage error recovery action. The recovery action may increase the latency of the read flow which may cause a translated address to get evicted from the ATC 118. In this case, the controller 202 may transmit an address translation request via the communications interface 200 at the expiration of the second timer to put the translated address back into the ATC 118.

In one embodiment, the risk of an address translation getting evicted out of the ATC may be high and the cost of checking for an address translation being present in the ATC is low. Therefore, the first timer will proceed as above. There will be a second timer set based on a predicted/expected latency of a secondary anticipated event. For example, the length of the second timer may be equal to the length of the read (prior example said 50 us) plus the length of time for a failed read to be reconstructed from other in-drive data. For example, some SSDs may read several other locations and execute a RAID recovery for lost data. The length of time for the RAID recovery and the length of time for the normal read will be added together to set the value of a second timer. This means the first timer may have triggered an address translation, but the address translation may have been evicted from the ATC. In the event it was evicted, the second timer will trigger a new request for the address in the ATC. In the event the address translation was still in the ATC, the second request for an address translation will be returned as immediately successful due to the address translation being present in the cache.

In one embodiment, the timing of an address translation request for a read command is based on achieving one or more milestones in a read processing flow. In this regard the controller 202 monitors progress of the read processing flow, and determines whether a progress milestone/step has been reached. The progress milestone may include, for example, Read Sense DONE in response to a polling event from the controller sent to the NAND Die in the storage device 102.

Pre-population of the ATC may also be desirable for processing write commands in a substantially high QD environment (e.g. QD>50). For example, in an unobstructed flow of the write commands, there may be a long queue of commands on the host's submission queue. The commands may be brought into the controller and parsed. The commands that are discovered to be a write command during the parsing stage are routed to a write processing pipeline, and as many as possible are started, and write data that is provided with the command is transferred into an internal buffer. The write command is then confirmed completed. The write data continues to reside in the volatile buffer, and it is programmed to the NAND for non-volatile storage at an independent speed from the write completion. In the event of a loss of power, capacitors hold the energy for the SSD long enough for the volatile cache to program out to the NAND.

However, there is a potential that the write command is very long with a very large amount of data or there is a potential that there are many write commands sent to the drive at once. Both of these cases may cause the controller to run out of buffer space. In this case, the write completion is held by the controller. The write is managed on an internal queue (e.g. the write buffer 214) while it waits for sufficient buffer space. Once all of the write data is in the drive in either case, then the write completion is sent to the host. Therefore, the large write commands may be programming the initial data out of the buffers while the later parts of the large write command could be waiting for buffer space to free up.

More specifically, in processing a write command, the controller 202 may store data transferred from the host memory 104 in the write buffer 214 prior to being transferred into the NVM media 206. In the substantially high QD environment where multiple write commands can be processed at a given time, one or more of the multiple write commands may need to wait for the write buffer 214 to become available in order for the processing to proceed. In one embodiment, multiple write command SQEs or perhaps one or more large write command SQEs provided by the host to the device will require more write buffer 214 than available. One, more than one, or the remaining portions of the write commands may be placed in the internal write command queue 216. In one embodiment, the controller 202 selects a subset of the write commands waiting in the internal write command queue 216, to request address translations for the selected write commands. In this manner, the ATC may be pre-populated with the translated addresses for the selected write commands.

Pre-population of the ATC may also be desirable for processing write commands of data stored in a substantially long list of memory locations within the host memory 104. The memory locations may be identified in one or more data structures, such as a linked list of SGL segments and/or SGL descriptors. In one embodiment, one or more address translation requests are transmitted for translating the virtual addresses in a first one of the SGL segments and/or SGL descriptors, into corresponding physical addresses. The controller 202 may perform a direct memory access of the host memory 104 to retrieve the data stored in the translated physical addresses. The retrieved data may be stored in the write buffer 214, and the data in the write buffer 214 may be written into the NVM media 206 (e.g. based on virtual block address (LBA) information in the received write command).

In the event that a second SGL segment and/or SGL descriptor stores virtual addresses for the write command, the controller 202 may transmit an address translation request for the virtual addresses in the second SGL segment for pre-populating the ATC with the translated addresses while a first direct memory access occurs based on the translated addresses of the first SGL segment. Having the addresses translated ahead of time may allow a second direct memory access (based on the translated addresses of the second SGL segment) to proceed after the first direct memory access, without waiting for an address translation for the virtual addresses in the second SGL segment to complete. In one embodiment, the pre-populating of the ATC for a next SGL segment while the write command is processed based on a current SGL segment continues until a last SGL segment has been processed.

In another embodiment, PRP segments may proceed in a similar manner as the SGL segments and/or SGL descriptors. Each PRP segment pointing to another PRP segment will have an address requiring translation. The controller 202 may request the address translations prior to requiring the translation. Optionally, one or more PRP segment may be read into the controller 202 in order to begin parsing the PRP. This early reading of the PRP further enables potential early address translation requests by the controller 202.

Figure 3A:
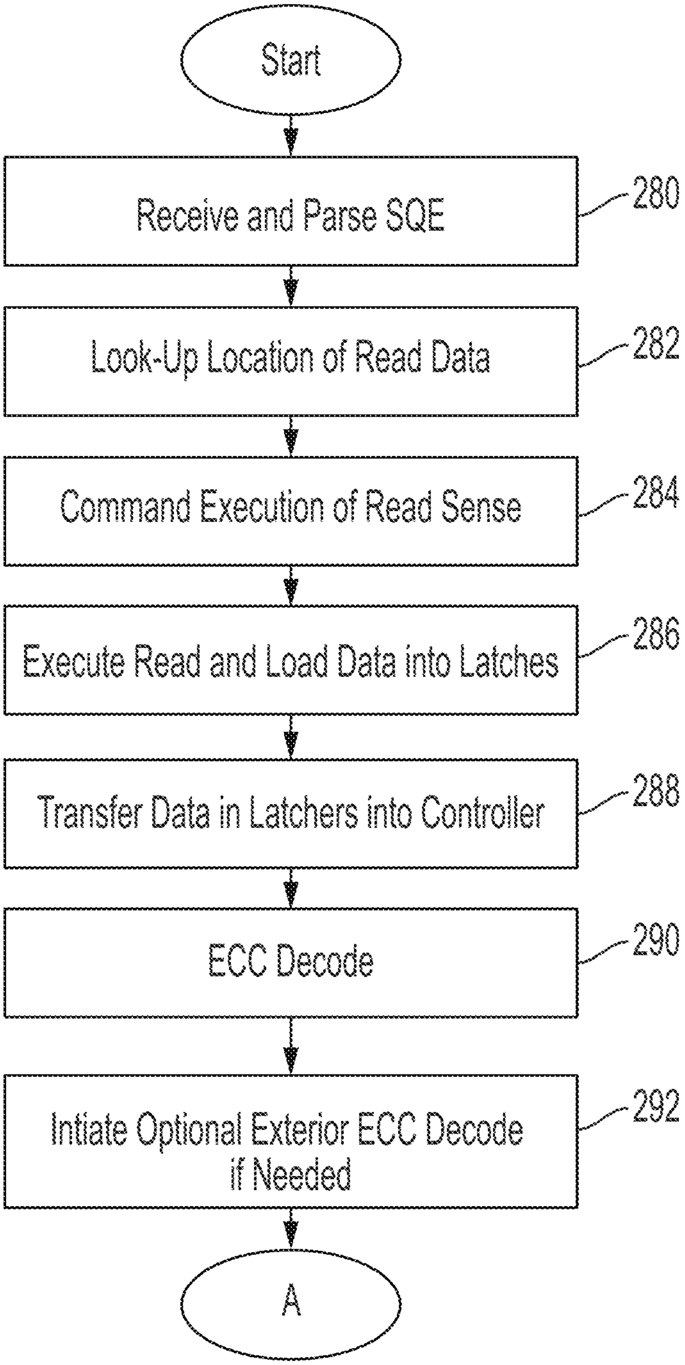
FIGS. 3A-3B are flow diagrams of a read flow according to one embodiment.
Figure 3B:
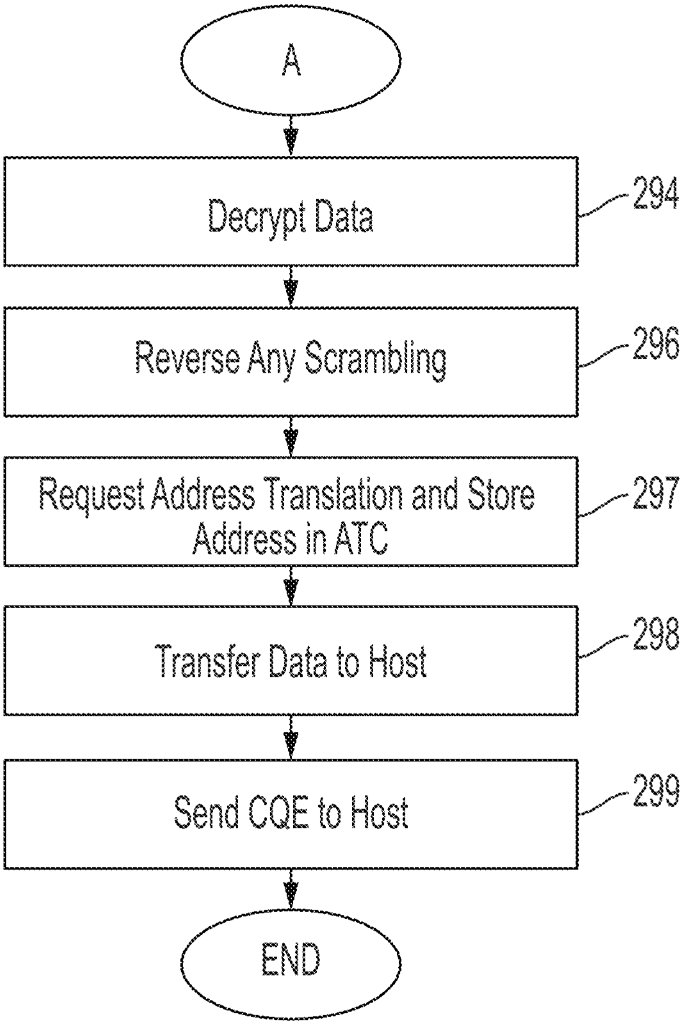

FIGS. 3A-3B are flow diagrams of a read flow without pre-population of the ATC. The flow starts, and in act 280, the controller 208 receives and parses an SQE containing a read command.

In act 282, the controller 208 identifies a location in the NVM media 206 where the read data is to be retrieved. For example, the controller 208 may perform a lookup in a logical to physical translation table, in the storage device's internal memory 204, for identifying the LBA where the read data is to be retrieved.

In act 284, a Read Sense command is issued to the NVM media 206.

In act 286, the Read Sense is executed, and the read data is loaded into the NVM media's latches.

In act 288, the data in the latches is transferred to the controller 202.

In act 290, the controller 202 invokes an error recovery action such as, for example, ECC decoding, to correct errors in the read data.

In act 292, the controller 202 invokes an optional second stage error recovery action in the event that the error correction in act 290 is unsuccessful in correcting all the errors. The second stage error recovery action may be, for example, an exterior ECC decoding like RAID.

In act 294, the read data may be decrypted, and any scrambling of the data may be reversed in act 296.

In act 297, the controller 200 transmits an address translation request to the translation agent 108 in the host device 100, and stores the translated address in the ATC 118.

In act 298, the controller 200 transfers the data to the host device 100. In this regard, the controller 200 retrieves, from the ATC 188, the translated address where to store the data, and stores the data into a location of the host memory 104 identified by the translated address.

In act 299, the controller 200 transmits a completion queue entry (CQE) which is stored in a completion queue in the host memory 104 and alerts the host processor 105 that the read request is complete. This may be done for example with an interrupt to the host device 100.

Figure 4:
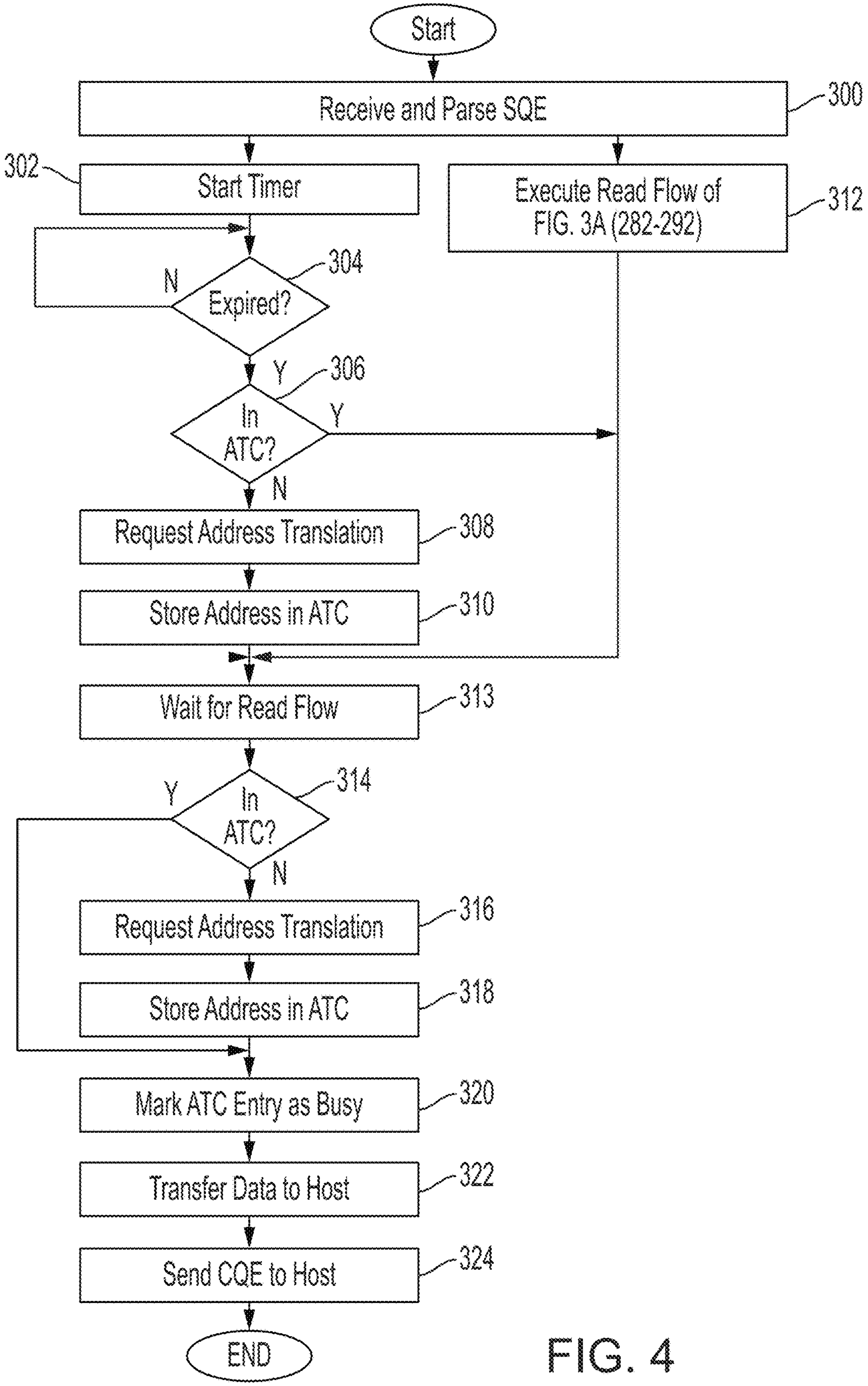
FIG. 4 is a flow diagram of a process for pre-populating an address translation cache (ATC) based on a timer according to one embodiment.

FIG. 4 is a flow diagram of a process for pre-populating the ATC 118 based on a timer according to one embodiment. The process starts, and in act 300, the controller 202 receives and parses an SQE storing a read command from the host 100. The SQE may be stored, for example, in a submission queue in the host device 100. The read command may adhere to a communications protocol such as, for example, the NVMe protocol. The read command may identify, for example, an address (e.g. starting LBA) of the NVM media 206 from where data is to be read, amount of data to be read, and a virtual address in the host memory 104 where data is to be transferred via a DMA.

The controller 202 starts a timer in act 304. The length of the timer may be shorter than a typical/expected latency of the read command.

In one embodiment, concurrently with the starting of the timer in act 302, the controller also initiates and executes, in act 312, a read flow per the received read command. The read flow may be similar to a portion of the read flow of FIG. 3A. For example, the read flow of act 312 may implement acts 282-292 of FIG. 3A.

While the read flow executes, the controller 202 checks, in act 304, whether the timer has expired. In one embodiment, the timer is set to expire prior to completion of the read flow of act 312.

If the timer has expired, the controller 202 checks the ATC 118 in act 306, for determining whether it contains a translation of the virtual address identified in the read command. If the address translation is in the cache already, then the request for the address translation is already satisfied, and acts 308 and 310 may be skipped.

Referring again to act 302, if the ATC 118 does not already contain the translation of the virtual address, the controller 202 submits an address translation request for the virtual address to the TA 108 in act 308. The TA 108 may search the ATPT 110 for the virtual address and output a corresponding physical address.

In act 310, the translated physical address is stored in the ATC 118 in association with the corresponding virtual address.

In act 313, the controller 202 waits for the read flow of act 312 to complete. If the read flow of act 312 takes longer than anticipated, the translated address in the ATC 118 may have been evicted and it may no longer be in the ATC 118. Thus, in act 314, the controller 202 checks to determine whether the ATC 118 still contains a translation of the virtual address.

If the answer is NO, the controller 202 submits an address translation request for the virtual address to the TA 108 in act 316.

In act 318, the controller 202 stores the translated address in the ATC 118 in association with the corresponding virtual address.

In act 320, the controller marks the ATC entry containing the virtual address as busy. The marking as busy may be for protecting against a translation becoming invalid, and there being a race condition on the device using the AT. In this regard, the host may choose to move host memory address pages for one or more reasons. When the host moves the pages, the host communicates to the TA, and the TA may update the ATPT. The TA may broadcast an invalidation packet to one or more endpoints that have an ATC. The packet tells the end devices to invalidate the address or range of addresses, and the devices remove the addresses from the ATC. If the device needs the translation, then a new request to the TA will be needed.

When the ATC entry is marked as busy, the ATC keeps the old invalid AT. The device is allowed to use the old stale value for data transfers that are in progress. The host is responsible for covering the race condition in a vendor specific manner. Once the AT is done being used, the ATC component on the device evicts the AT from the cache and completes the invalidation request from the TA.

In act 322, the read data is transferred to the translated physical address in the host memory 104.

In act 324, the controller 202 submits a CQE to the host to indicate completion of the read command.

Figure 5:
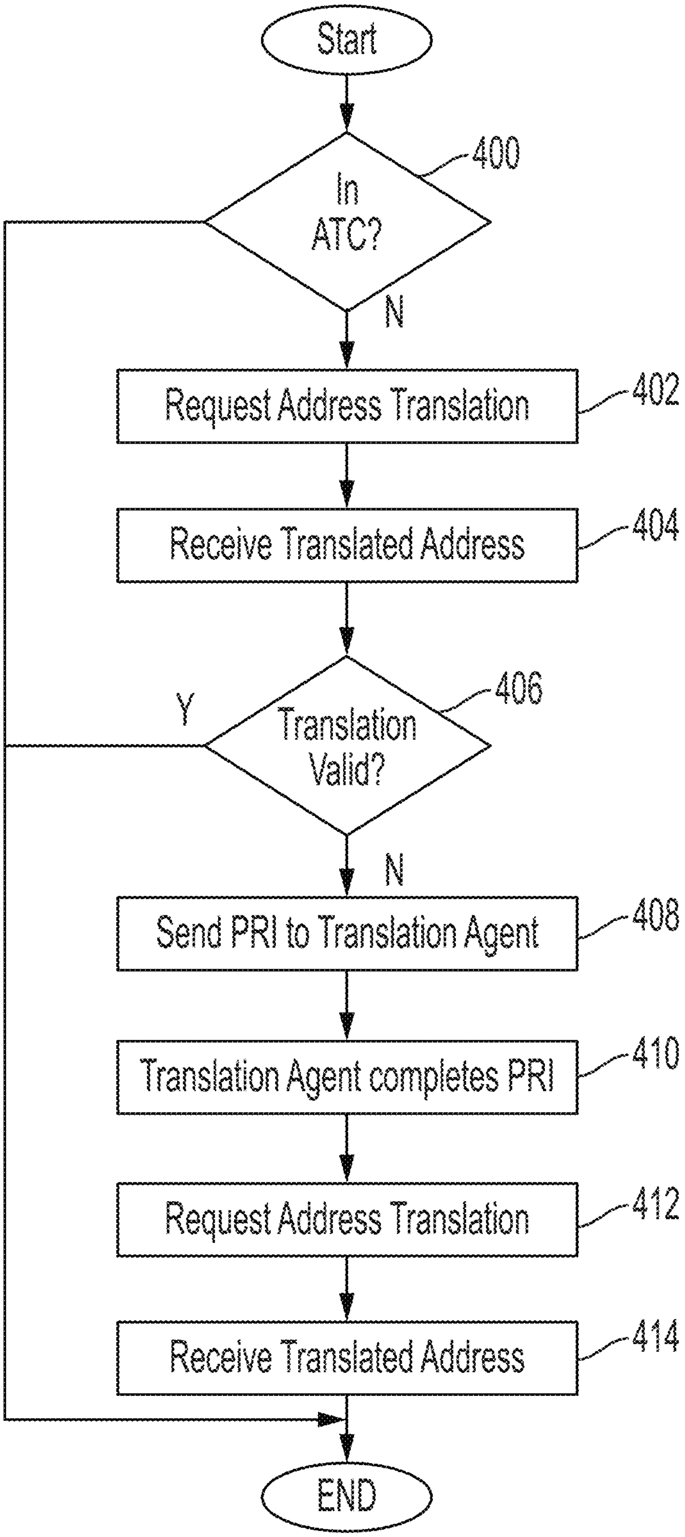
FIG. 5 is a flow diagram of a process for populating an address translation in an ATC according to one embodiment.

FIG. 5 is a flow diagram of a process for populating the ATC 118 with a translated address according to one embodiment. The process of FIG. 5 may be executed, for example, as part of the execution of acts 306-308 or 314-316, of FIG. 4.

In act 400, the controller 202 determines whether the virtual address of a read command is in the ATC 118. If the answer is NO, the controller 202 submits an address translation request for the virtual address to the TA 108 in act 402.

In act 404, the TA 108 responds to the controller 202 with the translated address or a translation failure.

In act 406, the translation is checked for success. If the answer is NO (implying a translation failure response), then the address was not found in the ATPT by the TA. The page with the requested memory address is not present in the host device memory 104. In this case, a PRI request is sent to the TA 108 in act 408.

The TA 108 executes a Host specific operation to populate the ATPT for this host device memory address 104, and the TA 108 completes the PRI in act 410.

In act 412, the controller 202 submits another address translation request for the virtual address to the TA 108.

In act 414, the translated address is received by the controller for storing in the ATC 118.

Figure 6:
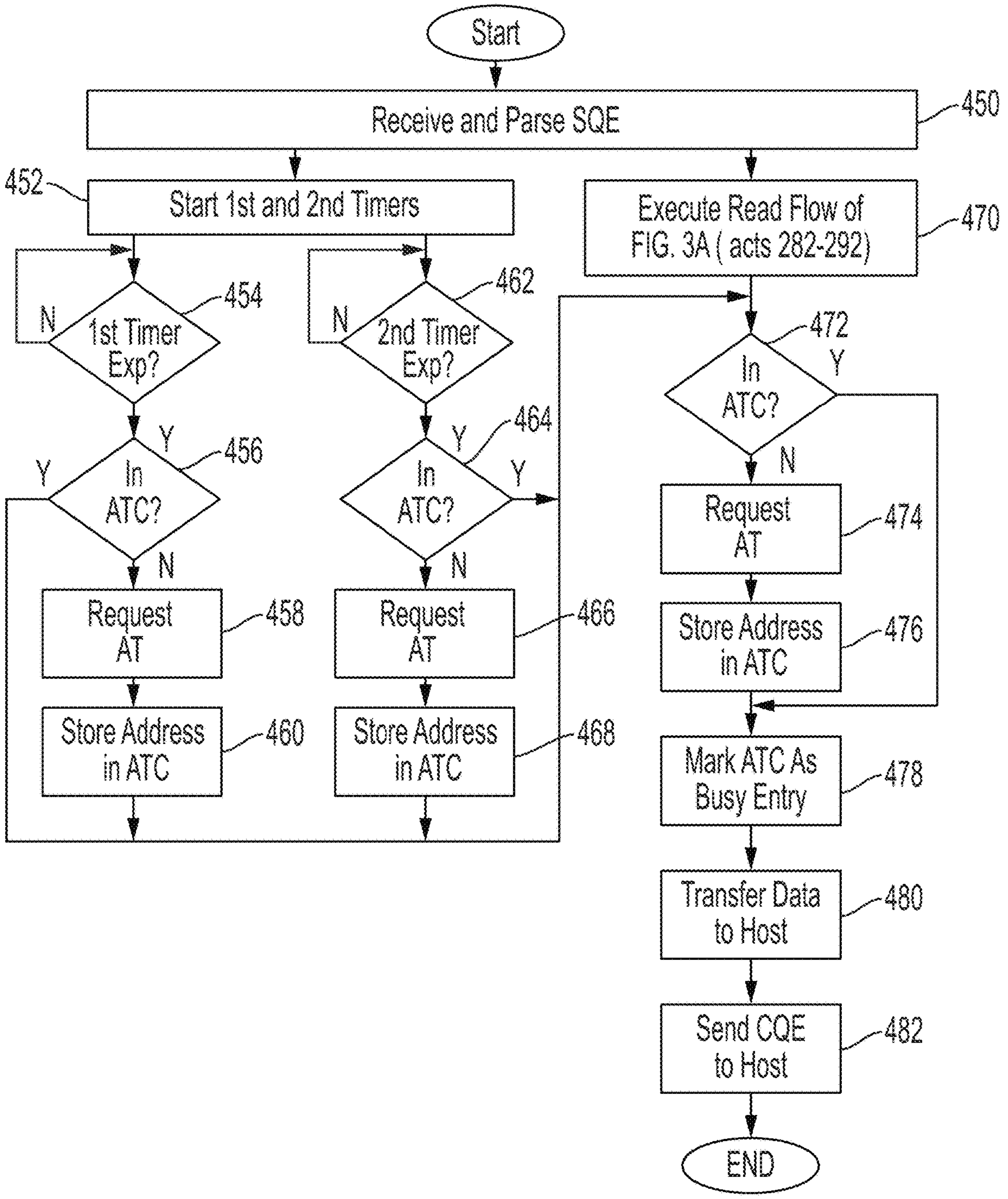
FIG. 6 is a flow diagram of a process for pre-populating an ATC based on at least two timers according to one embodiment.

FIG. 6 is a flow diagram of a process for pre-populating the ATC 118 based on at least two timers according to one embodiment. The process starts, and in act 450, the controller 202 receives and parses an SQE containing a read command.

In act 452, the controller 202 starts a first timer having a first expiration value/length, and a second timer having a second expiration value/length. The first timer may be set as described with reference to act 302 of FIG. 4.

In one embodiment, the length of the second timer is longer than the length of the first timer. The second timer may be set based on a potential event that may occur during execution of the read flow, which may delay completion of the read flow. The potential event may be, for example a second stage error recovery action (e.g. second stage of ECC decoding) that may initiate if a first stage ECC decoding fails in correcting errors in the data retrieved from the NVM media 206. In one embodiment, the detected event, such as the second stage error recovery, has a predicted/expected latency. The controller 202 may start the second timer based on the predicted latency in 452.

Concurrent with the start of the first and second timers, a read flow may initiate and execute in act 470 per the received read command. The read flow may be similar to a portion of the read flow of FIG. 3A. For example, the read flow of act 470 may implement acts 282-292 of FIG. 3A.

While the read flow is executing, the controller 202 checks, in acts 454 and 462, whether the first and second timers have expired, respectively. In one embodiment, the first timer expires first prior to completion of the read flow of act 470.

If the first timer has expired, the controller 202 checks the ATC 118, in act 456, for determining whether it contains a translation of the virtual address.

If the ATC 118 does not contain the translation of the virtual address, the controller 202 submits an address translation request for the virtual address to the TA 108 in act 458. The TA 108 may search the ATPT 110 for the virtual address and output a corresponding physical address.

In act 460, the translated physical address is stored in the ATC 118 in association with the corresponding virtual address.

In one embodiment, an event is detected during the execution of the read flow in act 470. The event may be, for example, execution of a second stage error recovery action (e.g. an external ECC decoding action) which may delay execution of the read flow in act 470. The delay of execution may cause the translated address get evicted from the ATC 118.

In one embodiment, the setting of the second timer in act 462 allows pre-populating of the ATC in the event that the translated address has been evicted from the ATC 118. The second timer may be set to expire substantially close to the end of the second stage error recovery action. In this regard, in act 462, a determination is made as to whether the second timer has expired.

If the answer is YES, a determination is made, in act 464, whether the translated address is still in the ATC 118.

If the answer is NO, the controller 202 submits an address translation request for the virtual address to the TA 108 in act 466. The TA 108 may search the ATPT 110 for the virtual address and output a corresponding physical address.

In act 468, the translated physical address is stored in the ATC 118 in association with the corresponding virtual address.

When the read flow of act 470 finishes execution, another check is made, in act 472, as to whether the translated physical address is still in the ATC 118. The read flow of act 470 may have varied in time. For example, it may have included the second stage ECC recovery which may take a very long time.

If the answer is NO, the controller 202 submits an address translation request for the virtual address to the TA 108 in act 474.

In act 476, the controller 202 stores the translated address in the ATC 118 in association with the corresponding virtual address.

In act 478, the controller marks the ATC entry containing the virtual address as busy.

In act 480, the read data (e.g. temporarily stored in the read buffer 212) is transferred to the translated physical address in the host memory 104.

In act 482, the controller 202 submits a CQE to the host to indicate completion of the read command.

It should be appreciated that when a read command completes, and DMA of the data uses the translated address in the ATC 118, the address in the ATC may be from a successful use of the first timer. In this case, the second timer may no longer be needed. In one embodiment, the second timer is stopped/deleted so that an additional address translation request in act 466 is not invoked. In some embodiments, the second timer is allowed to continue to run, and the superfluous second request is allowed to proceed.

Figure 7:
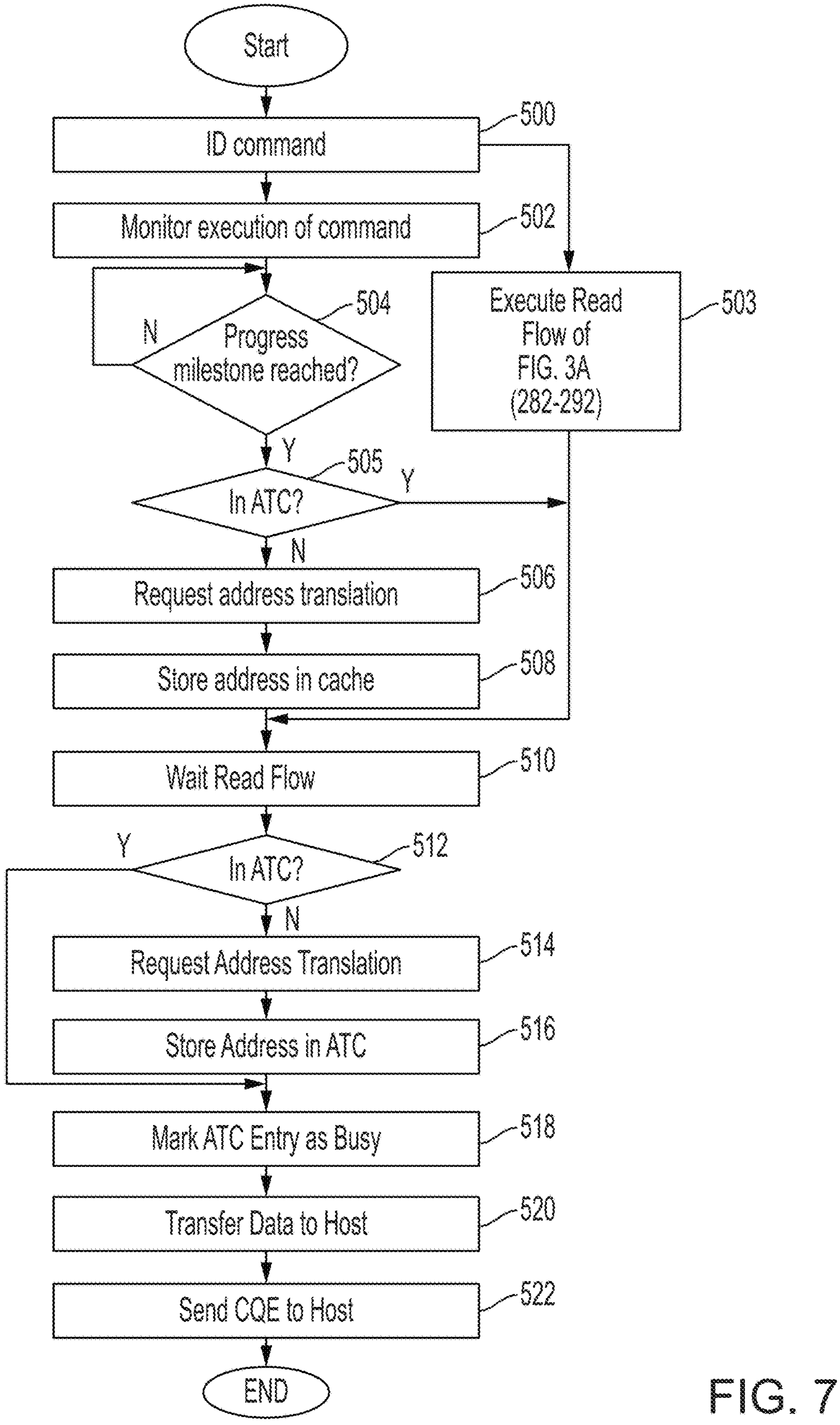
FIG. 7 is a flow diagram of a process for pre-populating an ATC based on monitoring progress of a read processing flow according to one embodiment.

FIG. 7 is a flow diagram of a process for pre-populating the ATC 118 based on monitoring progress of a read processing flow according to one embodiment. The process starts, and in act 500, the controller 202 identifies a read command from the host 100 for the storage device 102.

In act 502, the controller 202 monitors execution of the read command. For example, the controller 202 may monitor progress of milestones/steps achieved during a read flow 503. The read flow may be similar to a portion of the read flow of FIG. 3A. For example, the read flow of act 503 may implement acts 282-292 of FIG. 3A.

While the read flow is executing, the controller 202 checks, in act 504, whether a progress milestone has been reached. The milestone may be, for example, detection of successful completion of sensed signals by the sense amplifier. In some embodiments, the milestones may be other steps prior to detection of a successful completion of the sensed signals.

If the answer is YES, a determination is made, in act 505, as to whether the translated address is in the ATC 118. If the answer is YES, the controller 202 transmits, in act 506, a request for address translation for the virtual address contained in the read command, to the TA 108. The TA 108 may search the ATPT 110 for the virtual address and output a corresponding physical address.

The translated physical address is stored in the ATC 118 in act 508.

In act 510, the controller 202 waits for the read flow of act 503 to complete. If the read flow of act 503 takes longer than anticipated, the translated address in the ATC 118 may have been evicted from the ATC 118. Thus, in act 514, the controller 202 checks to determine whether the ATC 118 still contains a translation of the virtual address.

If the answer is NO, the controller 202 submits an address translation request for the virtual address to the TA 108 in act 514.

In act 516, the controller 202 stores the translated address in the ATC 118 in association with the corresponding virtual address.

In act 518, the controller marks the ATC entry containing the virtual address as busy.

In act 520, the read data is transferred to the translated physical address in the host memory 104.

In act 522, the controller 202 submits a CQE to the host to indicate completion of the read command.

It should be appreciated that one or more timers may be set relative to a progress marker. For example, the controller 202 may start a timer (for example 30 microseconds) after reaching the step of commanding a Read Sense to the NAND die.

Figure 8:
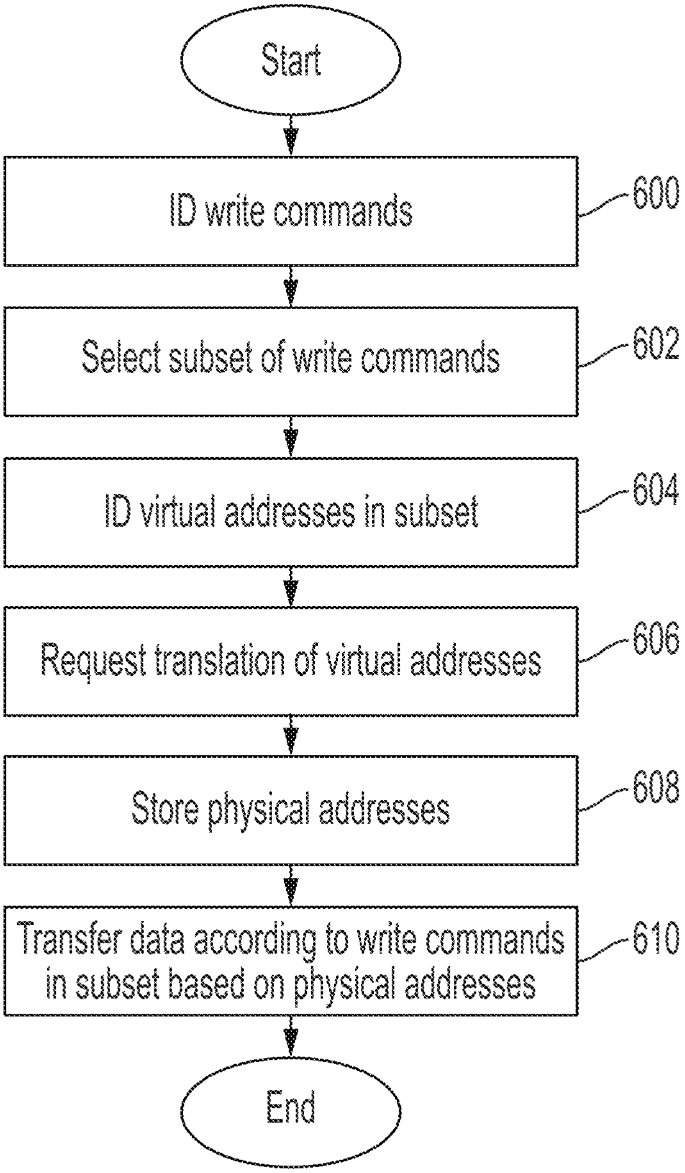
FIG. 8 is a flow diagram of a process for pre-populating an ATC in a substantially high queue depth environment where multiple write commands can be processed at a given time, according to one embodiment.

FIG. 8 is a flow diagram of a process for pre-populating the ATC 118 in a substantially high QD environment where multiple write commands can be processed at a given time, according to one embodiment. The process starts, and in act 600, the controller 202 identifies a plurality of write commands from the host 100 for the storage device 102. The plurality of write commands may need to wait for availability of the write buffer 214 in order for their processing to continue. While the plurality of write commands are waiting, the controller 202 may place the commands in the internal write queue 216 in the storage device's internal memory 204.

In act 602, the controller 202 selects a subset of the write commands waiting in the internal write queue 216. The selected subset may be less than a total number of write commands stored in the queue 216. The write commands that are selected may be in any order.

In act 604, the controller 202 identifies the virtual addresses in the selected subset of write commands.

In act 606, the controller 202 transmits one or more address translation requests to the TA 108 for the identified virtual addresses.

In act 608, the controller 202 receives the translated physical addresses from the AT 108, and stores the physical addresses in the ATC 118 in association with the corresponding virtual addresses. Due to the pre-populating of the ATC 118, the address translation for one of the write commands in the internal write queue 216 can be bypassed when the command is retrieved from the optional queue and processed.

In act 610, the controller 202 transfers data according to one or more of the write commands in the internal write queue 216 based on the physical addresses in the ATC 118.

Figure 9:
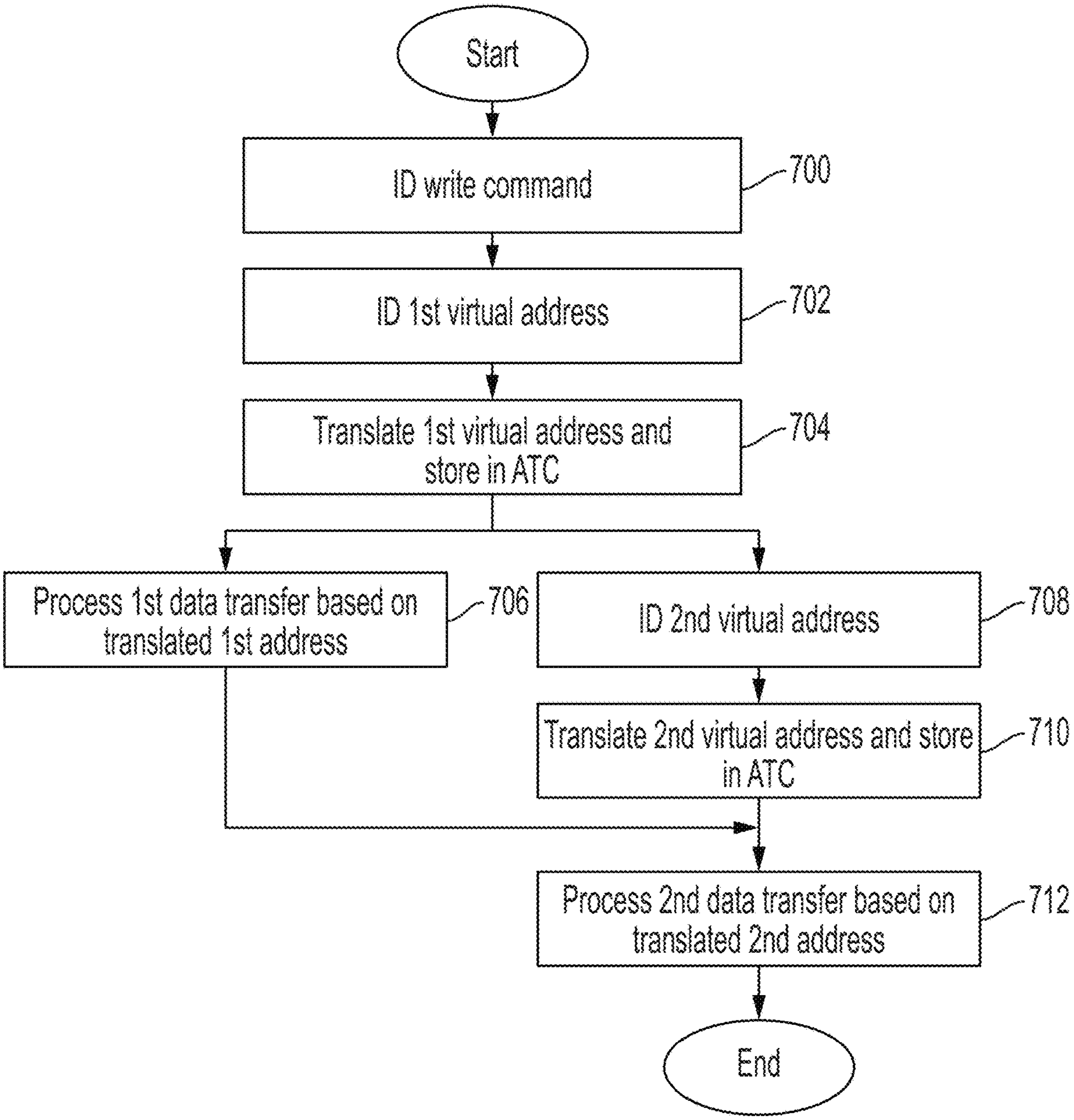
FIG. 9 is a flow diagram of a process for pre-populating an ATC for a write command that invokes a substantially long list of memory locations according to one embodiment.

FIG. 9 is a flow diagram of a process for pre-populating an ATC for a write command that invokes a substantially long list of memory locations according to one embodiment. The process starts, and in act 700, the controller 202 identifies the write command from the host 100. The write command may include, for example, an address (e.g. starting LBA) of the NVM media 206 where data is to be written, amount of data to be written, and a first SGL segment containing a first virtual address in the host memory 104 containing the data that is to be written, and a pointer to a second SGL segment.

In act 702, the controller 202 identifies the first virtual address from the first SGL segment.

In act 704, the controller 202 transmits an address translation request for the first virtual address, and stores the translated first physical address in the ATC 118 in association with the first virtual address.

In act 706, the controller 202 engages in a data transfer based on the translated first address. The data transfer may include accessing the host memory 104 for reading the data from the translated first address, storing the read data in a write buffer 214, and writing the data in the write buffer 214 to a location of the NVM media 206 based on the starting LBA in the write command.

In act 708, concurrently with the data transfer from the translated first address, the controller 202 identifies the second SGL segment pointed by the first SGL segment, and further identifies a second virtual address in the second SGL segment.

In act 710, the controller 202 transmits an address translation request for the second virtual address, and stores the translated second physical address in the ATC 118 in association with the second virtual address.

In act 712, the controller 202 engages in a data transfer based on the translated second address. Although not expressly shown in the flow if FIG. 7, a person of skill in the art should appreciate that the pre-populating of the ATC for a next SGL segment while the write command is processed based on a current SGL segment continues until a last SGL segment has been processed.

It should be understood that at every instance of the controller 202 requesting an address translation of the ATC has the option of updating ATC cache eviction schemes or not updating the ATC cache eviction schemes. For example, the first request in each of the flow diagrams may update the cache eviction scheme. However, the second or later request for an address translation may not be taken into account by the cache eviction scheme. This may accomplish, for example, only one cache eviction scheme update per command.

In some embodiments, the discussed above, are implemented in one or more processors. The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms “first”, “second”, “third”, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

With respect to the flow diagrams of FIGS. 3-7, it should be understood that the sequence of steps of the processes in those flow diagrams are not fixed, but can be modified, changed in order, performed differently, performed sequentially, concurrently, or simultaneously, or altered into any desired sequence, as recognized by a person of skill in the art.

As used herein, the terms “substantially,” “about,” and similar terms are used as terms of approximation and not as terms of degree, and are intended to account for the inherent deviations in measured or calculated values that would be recognized by those of ordinary skill in the art.

As used herein, the singular forms “a” and “an” are intended to include the plural forms as well, unless the context clearly indicates otherwise. It will be further understood that the terms “comprises” and/or “comprising”, when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. Expressions such as “at least one of,” when preceding a list of elements, modify the entire list of elements and do not modify the individual elements of the list. Further, the use of “may” when describing embodiments of the inventive concept refers to “one or more embodiments of the present disclosure”. Also, the term “exemplary” is intended to refer to an example or illustration. As used herein, the terms “use,” “using,” and “used” may be considered synonymous with the terms “utilize,” “utilizing,” and “utilized,” respectively.

It will be understood that when an element or layer is referred to as being “on”, “connected to”, “coupled to”, or “adjacent to” another element or layer, it may be directly on, connected to, coupled to, or adjacent to the other element or layer, or one or more intervening elements or layers may be present. In contrast, when an element or layer is referred to as being “directly on”, “directly connected to”, “directly coupled to”, or “immediately adjacent to” another element or layer, there are no intervening elements or layers present.

Any numerical range recited herein is intended to include all sub-ranges of the same numerical precision subsumed within the recited range. For example, a range of “1.0 to 10.0” is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of systems and methods for pre-populating an address cache according to one embodiment have been specifically described and illustrated herein, many modifications and variations will be apparent to those skilled in the art. Accordingly, it is to be understood that systems and methods for pre-populating an address cache constructed according to principles of this disclosure may be embodied other than as specifically described herein. The disclosure is also defined in the following claims, and equivalents thereof.

What is claimed is:

1. A method for processing commands from a host computing device to a storage device, the method comprising:
- identifying, by the storage device, a command from the host computing device, the command including a logical address;
- based on identifying the command, detecting a condition by the storage device;
- based on detecting the condition, transmitting, by the storage device to the host computing device, a request;
- based on transmitting the request, receiving, by the storage device from the host computing device, a physical address corresponding to the logical address; and
- transferring data according to the command based on the physical address.

2. The method of claim 1 further comprising:
- starting, by the storage device, a first timer in response to identifying the command, wherein the condition includes detecting expiration of the first timer.

3. The method of claim 2, wherein length of the first timer is shorter than a predicted latency of processing the command.

4. The method of claim 2, wherein length of the first timer is dynamically computed based on a number of active commands to be processed.

5. The method of claim 2 further comprising:
- setting, by the storage device, a second timer;
- detecting expiration of the second timer;
- based on the expiration of the second timer, requesting, by the storage device, translation of the logical address into the physical address, wherein length of the second timer is based on an expected length of completing an event during processing of the command by the storage device.

6. The method of claim 5, wherein the event includes invoking an error recovery action.

7. The method of claim 1, wherein the command includes a command to read the data from the storage device, wherein the logical address is for storing the data in a memory location of the host computing device.

8. The method of claim 1 further comprising:

monitoring progress of execution of the command, wherein the detecting the condition includes determining that a milestone has been reached.

9. The method of claim 8, wherein the monitoring includes monitoring a plurality of steps executed for the command.

10. The method of claim 8, wherein the milestone includes completion of sensing of signals from one or more memory cells of the storage device.

11. A storage device comprising:

a cache; and a processor coupled to the cache, the processor being configured to execute logic that causes the processor to:

identify a command from a host computing device, the command including a logical address;

based on identifying the command, detect a condition by the storage device;

based on detecting the condition, transmit a request to the host computing device;

based on transmitting the request, receive from the host computing device a physical address corresponding to the logical address; and transfer data according to the command based on the physical address.

12. The storage device of claim 11 further comprising:

start a first timer in response to identifying the command, wherein the logic that causes the processor to detect the condition includes logic that causes the processor to detect expiration of the first timer.

13. The storage device of claim 12, wherein length of the first timer is shorter than a predicted latency of processing the command.

14. The storage device of claim 12, wherein logic causes the processor to dynamically compute length of the first timer based on a number of active commands to be processed.

15. The storage device of claim 12, wherein the logic further causes the processor to:

set a second timer;

detect expiration of the second timer;

based on the expiration of the second timer, the logic causes the processor to request translation of the logical address into the physical address, wherein length of the second timer is based on an expected length of completing an event during processing of the command by the storage device.

16. The storage device of claim 15, wherein the event includes invoking an error recovery action.

17. The storage device of claim 11, wherein the command includes a command to read the data from the storage device, wherein the logical address is for storing the data in a memory location of the host computing device.

18. The storage device of claim 11, wherein the logic further causes the processor to:

monitor progress of execution of the command, wherein the logic that causes the processor to detect the condition includes logic that causes the processor to determine that a milestone has been reached.

19. The storage device of claim 18, wherein the logic that causes the processor to monitor includes logic that causes the processor to monitor a plurality of steps executed for the command.

20. The storage device of claim 18, wherein the milestone includes completion of sensing of signals from one or more memory cells of the storage device.

* * * * *